United States Patent Office 2,760,337
Patented Aug. 28, 1956

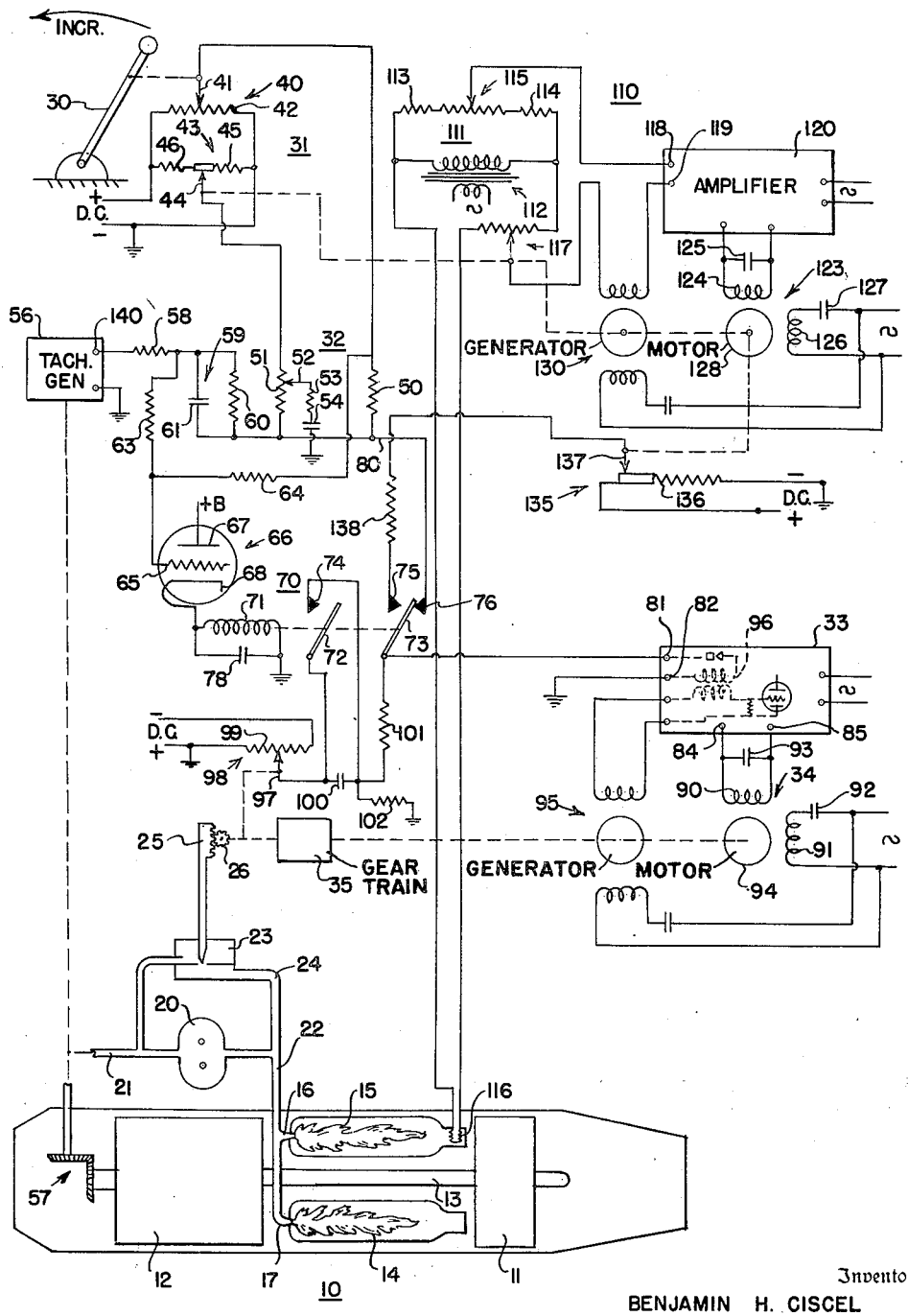

2,760,337

JET ENGINE FUEL CONTROL APPARATUS

Benjamin H. Ciscel and Eduard C. Petry, Minneapolis, Minn., assignors to Minneapolis-Honeywell Regulator Company, Minneapolis, Minn., a corporation of Delaware Application April 21, 1950, Serial No. 157,304

17 Claims. (Cl. 60—39.28)

The present invention is concerned with a new and improved control apparatus for a combustion engine. More particularly it is concerned with a fuel flow control apparatus for an engine of the gas driven turbine type where transient control problems exist due to changing loads or power demands.

The control of combustion engines of the gas turbine type is conventionally accomplished by controlling the flow of fuel to the engine in accordance with engine speed. When it is desired to accelerate the engine from a low power level to a high power level, if the control is left under the control of engine speed, the time of acceleration is much too long for most applications, as, for example, when the engines are used in military aircraft. The present control apparatus is arranged so that the fuel flow is normally under the control of engine speed until a condition indicating a need for acceleration exists. When the control senses a need for acceleration, engine temperature is made the prime controlling factor of fuel flow. With engine temperature controlling fuel flow the acceleration time is greately decreased. During acceleration or transient conditions, when the power is being increased, as well as during periods of normal or steady state operation, it is necessary that provision be made to prevent the overheating of the engine and the destruction thereof due to the overheating. The present control apparatus is effective to improve the acceleration characteristics of the controlled engine yet maintain the engine within safe operating limits. Particularly important during acceleration is the maintaining of the temperature below a maximum safe value, which value may be higher than the maximum safe value during steady state operation. Such protection will greatly increase the service life of the entire engine.

It is, therefore, an object of the present invention to provide a new and improved control apparatus for regulating the flow of fuel to a combustion engine.

A further object of the present invention is to provide an engine fuel flow control apparatus which normally controls fuel flow in accordance with engine speed and which, upon a transient condition occurring, controls fuel flow in accordance with engine temperature.

A still further object of the present invention is to provide an engine fuel flow control apparatus which when controlling fuel flow in accordance with engine speed provides load compensation means and when controlling fuel flow in accordance with engine temperature the load compensation means becomes a rebalancing means.

Another object of the present invention is to provide an engine fuel flow control apparatus which normally controls fuel flow in accordance with engine speed with an engine temperature sensing apparatus maintaining the fuel flow below a value which would overheat the engine and which under transient conditions controls the fuel flow independently of the engine speed and in accordance with engine temperature.

Still another object of the present invention is to provide a new and improved motor control apparatus which under a first set of conditions is under the control of a first control mechanism and under a second set of conditions is under the control of a second control mechanism.

These and other objects of the present invention will be understood upon a consideration of the following specification and the appended drawing wherein the single figure represents schematically the present engine power control apparatus connected to control an engine of the gas turbine type.

Referring to the drawing, the numeral 10 represents a diagrammatic showing of a combustion engine of the gas turbine or jet engine type. This combustion engine comprises a turbine 11 which drives a compressor 12 by means of an interconnecting shaft 13. The driving energy for the turbine 11 is obtained from hot gases expanding through the turbine. Fuel for the combustion chambers 14 and 15 is supplied into the chambers through fuel nozzles indicated by the numerals 16 and 17, the fuel flow being induced by pump 20. The pump 20 pumps fuel from a fuel supply tank, not shown, through the conduit 21 and through the conduit 22 which connects to the nozzles 16 and 17. To regulate the amount of fuel that will flow through the conduit 22 to the nozzles 16 and 17 there is provided a by-pass valve 23 which is located in a by-pass conduit 24. The by-passing of the fuel through the valve 23 may be controlled by a gear and rack adjusting means indicated at 25. The apparatus as described thus far forms no part of the present invention but indicates generally a type of arrangement with which the present invention can be used.

The control apparatus for the fuel by-pass valve 23 is basically an electro-mechanical system that includes a power selecting lever 30 which normally acts through electrical circuits indicated generally by the numerals 31 and 32 and through a modulator and amplifier 33 to control a reversible motor 34. The motor 34 in turn operates through a gear train 35 to position a pinion gear 26 acting on the fuel valve rack 25.

Referring to the electrical network circuit 31, it will be seen to comprise a first potentiometer 40 having a slider 41 which is movable by the lever 30 over an associated slide wire 42. A further potentiometer 43 is connected in the network 31 and this potentiometer has a slider 44 movable over an associated slide wire 45. A resistor 46 is connected in series with the slider wire 45. A suitable direct current power source, not shown, has its output terminals connected to supply power to the end terminals of the potentiometer 40, and the resistor 46 and slide wire 45 connected in series.

The output signals which appear upon the sliders 41 and 44 are applied to the summing network 32 which comprises a plurality of summing resistors including the resistors 50 and 51, the latter of which has a slider 52 movable thereon and a resistor 53 and condenser 54 connected in series therewith to ground.

Also, applying a control signal to the summing network 32 is a direct current tachometer generator 56 whose electrical output is proportional to the speed of rotation of the engine shaft 13. The generator is driven by a suitable coupling arrangement indicated generally by the numeral 57. The output of the generator is fed through a first resistor 58 and a summing network 59 which comprises a summing resistor 60 and a capacitor 61 connected in parallel therewith. The output from the generator 56 and the slider 41 are fed through a further pair of summing resistors 63 and 64 to the control grid 65 of an electron discharge device 66 which, in addition to the control grid 65, has an anode 67 and a cathode 68 with power supplied thereto by a suitable source of power, not shown. This discharge device 66 has in circuit therewith in the cathode circuit a control relay 70 having a relay winding 71 and a pair of switch blades 72 and 73 normally biased out of engagement with a pair of contacts 74 and 75. The switch blade 73 is normally biased into engagement with a contact 76. A suitable bypass condenser 78 is connected in parallel with the winding 71.

The output from the summing network 32 taken on a conductor wire 80 is fed through the contact 76, switch blade 73 to the input terminals 81 and 82 of the modulator and amplifier 33. The modulator and amplifier 33 may be of any suitable type well known in the art which is capable of converting the direct current signal on the input thereof to alternating current where it is amplified and when appearing on the output terminals of the amplifier will be of phase which will be dependent upon the polarity of the direct current input signal on the input to the modulator. A showing of such an amplifier and modulator arrangement will be found in Jones Patent 2,306,479, issued December 29, 1942.

The output from the modulator and amplifier 33 appears on terminals 84 and 85 and, as mentioned above, will be an alternating voltage of reversible phase. This output signal is applied to the amplifier winding 90 of the two phase reversible motor 34. The motor 34 also includes a line phase winding 91 which has power supplied thereto from an alternating current source, not shown, through a phase shifting capacitor 92. A capacitor 93 is connected in parallel with the amplifier phase winding 90 as is conventional with reversible two phase motors. As mentioned above, the motor 34 is effective through the rotor 94 to drive the pinion gear of the bypass valve 23. Also driven by the motor 34 is a suitable velocity generator 95 which is a source of an anti-hunting signal which maintains the operation of the motor 34 stable, as is well known in the art. The output of the velocity generator is coupled into the alternating current signal portion of this amplifier as indicated by dotted lines 96 within the modulator amplifier 37 and as taught by the Riggs Patent 2,115,086, issued April 26, 1938. The motor 34 also drives a slider 97 of a potentiometer 98 which includes a slide wire 99. The slide wire 99 is connected to a direct current power supply, not shown. The electrical signal on the slider 97 is fed, when changing, through a load compensating capacitor 100, a summing resistor 101 into the input of the modulator and amplifier 33. The resistor 102 connects the right hand terminal of the capacitor 100 to ground.

For determining engine temperature a control circuit indicated generally by the numeral 110 has been provided. This control circuit includes a temperature sensing bridge 111 of Wheatstone type which has power supplied thereto by an alternating current transformer 112. Connected to the output of the transformer 112 are the arms of the bridge which include a pair of fixed resistors 113 and 114, a calibrating potentiometer 115, a temperature sensing resistor 116 and a follow-up or rebalancing potentiometer 117. The resistor 116 is exposed to the temperature of the gases as they enter the turbine 11. The output of the bridge 111 is connected to the input terminals 118 and 119 of a suitable amplifier 120. The output of this amplifier is fed to a two phase reversible motor 123 having an amplifier winding 124 with a condenser 125 and parallel therewith and a line phase winding 126 with a phase shifting capacitor 127 in series therewith. This amplifier-motor combination may be of the type disclosed in the Upton Patent 2,423,534, issued July 8, 1947. A rotor 128 is effective to drive a velocity generator 130 which functions to stabilize the operation of the temperature control. This velocity generator has its output winding coupled in series with the alternating current signal from bridge 111 and functions in the manner disclosed in the Riggs patent, mentioned above.

The output of the motor 123 also is effective to position the slider of the potentiometer 117 which rebalances the network 111 and the slider 44 of potentiometer 43, the latter of which is in the network 31, previously described. The motor 123 is also operative to position a slider 137 over an associated slide wire 136 of a potentiometer 135. This potentiometer 135 has power supplied thereto by a suitable source of direct current, not shown. A summing resistor 138 is connected in the lead running from the slider 137 to contact 75.

Operation

In considering the operation of the present control, it will be first assumed that the engine is in operation with the fuel pump 20 supplying a predetermined amount of fuel to the nozzles 16 and 17 and gases from the chambers 14 and 15 are expanding through the turbine 11 to drive the same. It will also be assumed that the speed of the engine as measured by the tachometer generator 56 is the same as that selected by the power lever 30, the latter of which is actually an engine speed selector.

When the speed of the engine matches that speed selected by the power lever 30, there will be no input signal to the modulator and amplifier 33. This will be understood when it is noted that the electrical signals from the slider 41 of the power selecting potentiometer, electrical signals from the slider 44 of the temperature limit potentiometer 43 and that from the tachometer generator 56 will cancel out when all of these signals have been added by parallel addition through their respective summing resistors 50, 51 and 60. This will be seen when it is noted that the direct current applied to the network 31 is polarized so that the right hand end of each of the potentiometers 43 and 40 is negative with respect to the left end. Thus, with the right hand end grounded, the signals on the sliders 41 and 44 will be positive with respect to ground. The output signal from the tachometer generator 56 is always negative on terminal 140 with respect to a common ground since the positive terminal of the generator is grounded. When this negative signal is combined with that signal from the network 31, the net result will be zero and there will be no signal applied to the modulator 33 from the conductor 80, the latter of which is connected through contact 76 and switch blade 73 to the modulator and amplifier 33. Thus, the apparatus will remain in the position in which it is shown in the drawing.

If there should be a gradual decrease in the load on the turbine or a decrease in the back pressure on the turbine, its speed would tend to increase. With an increase in speed, the tachometer generator will have a larger output signal which means that the former balanced condition will not longer exist and there will be an input signal to the modulator amplifier 33. This input signal will be negative with respect to ground and will result in an input signal to the amplifier which will cause the amplifier to drive the motor 34 in a direction to cut down fuel flow.

As the motor 34 moves the pinion gear 26 to cut down fuel flow, it also moves slider 97 on the slide wire 99. As the capacitor 100 is connected in series between the slider 97 and the grounded resistor 102, there will be a change in the charge on the capacitor and while this change in charge is taking place there will be a signal appearing across the resistor 102. This signal will be of a polarity which will be dependent upon the direction of movement of the slider 97. Assuming the slider 97 moved to the left when the fuel flow is being decreased, the voltage drop on the resistor 102 will be positive on the left hand terminal and negative on the ground terminal. This voltage will be present as long as the slider 97 is moving and the capacitor 100 is changing its charge. The effect of this voltage will be to apply to the input of the modulator-amplifier 33, through the summing resistor 101, a temporary rebalance voltage which will prevent the motor from decreasing the fuel flow to the engine too fast and by too great a degree. When the rebalance voltage appears on the input of the modulator amplifier 33, the motor will be stopped and the transient rebalance signal from the condenser 100 and resistor 102 will die out. If the adjustment of the fuel valve was sufficient to correct the gradual shift in engine speed and the speed has changed back to the value selected by the power lever 30, the negative output signal of the tachometer generator 56 will again equal the magnitude of the positive signal from the network 31 and the resultant signal when combined upon the conductor 80 will again be zero. If the adjustment of the valve 23 was not sufficient to drop the engine speed to the desired value, the control apparatus will go through another step, as explained above, and the fuel flow to the engine will be further decreased in an attempt to maintain the engine speed exactly at that value selected by the power lever 30.

Inasmuch as the rebalance potentiometer 98 is effective only when the slider 97 is moving and there is a changing of the charge on the capacitor 100, it will be obvious that when the signal on the resistor 102 disappears, the only signal controlling the motor 34 will be from the tachometer generator 56 and the network 31. Thus, the condenser 100 with resistor 102 provides a load compensation arrangement which is effective to always maintain the actual controlled speed at a value which will be exactly the same as that selected by the power lever 30 and such speed will be maintained regardless of the position of the rebalancing slider 97 when the same is stationary. In other words, the control apparatus will be effective to position the control valve 23 as long as there is a difference between the selected speed and the actual speed, thus the rebalance portion of the apparatus is effective to rebalance only when an adjustment is being made of the fuel valve and when the motor stops, the rebalance signal is eliminated so that a further sensing is made to see if the actual engine speed is the same as the speed selected. It will be obvious that if there is a gradual change in the engine speed in either direction from that selected, the apparatus will be effective to change the fuel flow to bring the engine speed back to the value desired.

In the event that the temperature of the engine should rise above a value which would be safe for continued operation, it is desired that the fuel flow to the engine be cut down and the temperature decreased. This limiting action is accomplished by the action of the slider 44 moving on the slide wire 45, the slider 44 being positioned by the temperature indicating portion 110. In operation, the network 111 acts as a conventional Wheatstone bridge type of circuit with the unbalance output signal being applied to the input terminals of the amplifier 120. The unbalance signals are effective to cause the amplifier to energize the motor 123 and drive the motor in a direction which will rebalance the network 111. When the motor 123 is rebalancing the network 111 by the adjustment of the rebalance potentiometer 117 the motor is also effective to make an adjustment of the slider 44 on the slide wire 45. A shorted segment is formed on one end of the resistor 45 so that the movement of the motor 123 will not be effective to give a change in output signal until a predetermined temperature has been reached which may be, for example, 1500° F. As soon as the predetermined maximum safe temperature has been reached, the slider 44 will start moving to the right across the resistance portion 8 slide wire 45 and this will have the effect of decreasing the amount of positive voltage arising in the network 31. With a decrease in the amount of positive voltage arising in network 31, with the same engine speed and output from the tachometer generator 56, there will be a predominantly negative signal applied to the input of the modulator amplifier 33. This negative signal will be effective to cause the motor 34 to decrease the amount of fuel flowing into the engine through the fuel nozzles 16 and 17. The coupling between the motor 123 and slider 44 may be so arranged that the slider 44 will make the full movement over the slide wire 45 with a relatively small change in temperature. For example, with an assumed limiting value of 1500° as the value when the slider 44 will start changing the signal in network 31, the coupling may be so arranged that by the time the temperature of the engine has reached 1520°, the slider 44 will have moved to the right end of the slide wire resistor 45. With such an arrangement as this it will be insured that the potentiometer 43 has considerable authority in reducing the fuel flow to the engine. Normally, the slider 44 is never moved the full extent of the slide wire resistor 45 for the authority of the potentiometer 43 is sufficient to decrease the fuel flow to the engine to a point where it is impossible to have a temperature which can cause damage to the engine. As soon as the engine temperature has returned to a safe value the motor 123 will move the slider 44 back to the left end of the slide wire resistor 45 and the apparatus will continue to operate in a normal manner, as explained above. The effect of the condenser 61 in summing network 59 is to give a rate of change of generator output signal which is combined with the actual change from the generator. With this rate of change signal added to the active change signal, it is possible to respond quicker to changes in engine speed and initiate a corrective action upon the operation of the by-pass fuel valve.

Capacitor 54 and resistor 53, connected between the slider 52 and a common ground, have the effect of adding an integrated signal to the signal derived from slider 44 of the temperature limiting potentiometer 43. This integrating effect tends to prevent transient signals arising in the limiting potentiometer 43 from affecting the operation of the system and to delay the effect of the output control signal from the slider 44 when there is a movement thereof. Thus, if a temperature limiting signal should only momentarily occur, it has a relatively small affect upon the system and if there should be a sustained temperature limiting signal, the affect of that signal will be maintained for a period slightly longer than it normally would when the temperature goes back to a safe value.

Under the normal operating conditions that have been assumed thus far, the operation of the electron discharge device 66 has been disregarded as it is normally deenergized. The reason it is deenergized will be seen when it is noted that the grid 65 has two signals effectively applied thereto, one being the negative signal from the tachometer generator fed through the summing resistors 63 and the other being the positive signal from the power selecting slider 41 fed through the summing resistors 64. As long as the signals are approximately equal, the resultant signal on the grid 65 will be approximately zero. With this zero signal on the grid and with the relay winding 71 in the cathode circuit acting as a cathode bias resistor, the current flow through the discharge device 66 will be less than that necessary to energize the relay 71 and the relay will remain in a position in which it is shown upon the drawing.

If the operator should decide to increase the power or thrust from the engine, he would move the power lever 30 to the left. In order to get to the new power which has been selected, it has been found that the quickest way is to increase the fuel flow to a maximum safe value until the engine speed equals that of the new power lever setting. The present apparatus is arranged so that a minimum time will be required to accelerate from low power to high power.

Upon a sudden movement of the power lever from a low power position to a high power position, when the slider 41 is moved from the right end of the slide wire resistor 42 to the left end thereof, there will be a sudden increase in the magnitude of the positive signal appearing upon the slider 41. This positive signal on the slider 41 will be applied to the grid 65 through the summing resistor 64. With the increased positive voltage appearing upon the grid 65 and with the engine speed not having changed accordingly, the resultant signal on the grid 65 is positive and the current flow through the tube is sufficient to effect energization of the relay 70. When the relay 70 becomes energized the switch blades 72 and 73 move into engagement with their associated switch contacts 74 and 75 and the switch blade 73 will move out of engagement with contact 76. When the switch blade 72 engages with contact 74 the capacitor 100 is shorted out and is no longer effective as a load compensation device. When the capacitor 100 is shorted out the slider 97 of the rebalancing potentiometer 98 is connected to the input of the modulator and amplifier 33 through the switch blade 72, switch contact 74, and summing resistor 101 to the input terminal 81.

When the switch blade 73 engages contact 75 a circuit is completed from the slider 137 of the potentiometer 135 through the summing resistor 138, switch contact 75, switch blade 73 to the input terminal 81 of the modulator and amplifier 33. The modulator and amplifier 33 is thus under the control of the potentiometers 98 and 135 and the amplifier can drive the motor 34 in accordance with the signals arising from these two potentiometers.

In determining what the initial effect of the potentiometers 98 and 135 is upon the modulator and amplifier 33 it should first be noted that the potentiometer 135 is arranged so that normally the slider 137 is on the left end of the slide wire resistor 136 when there is shorted segment of resistance. With the left terminal of slide wire 136 positive with respect to the right terminal, which is grounded, the slider 137 will have a positive voltage thereon. The slider will remain in that position until such time as the temperature of the engine exceeds a maximum safe value which, since the operation during the transient is of relatively short duration, may be higher than the safe value assumed for normal operating conditions. This limiting value may be, for example, 1675° F. Thus, the temperature indicating motor 123 will, upon the engine temperature reaching 1675°, start moving the slider 137 across the resistance portion of slide wire resistor 136 toward the right hand terminal. The coupling between the motor 123 and slider 137 may be so arranged that a 50° change in temperature as indicating by the motor 123 is effective to move the slider 137 over the full length of the slide wire resistor 136. Thus, if the engine temperature should reach 1725° F., the slider 137 will have been moved to the right hand terminal of resistor 136.

Referring to the potentiometer 98, it will be noted that, with the positive or left end of the slide wire 99 being grounded and the right hand terminal of the slide wire 99 being negative, the slider 97 has a negative potential thereon which will be of a magnitude dependent upon the displacement of the slider 97 from the right hand or grounded end of the slide wire 99. Normally, this displacement will not be initially large if the operator suddenly moves his slider 30 from a low power position to a high power position so that the signal will be slightly negative. With the slider 137 on the positive end of the slide wire resistor 136 and the slider 97 being slightly negative, the combined signals on the input terminals 81 and 82 of the modulator and amplifier 33 will be positive due to the fact that the slider 137 will have a larger potential thereon than the negative potential on slider 97. With this positive voltage being applied to the input of the amplifier the motor 34 will be energized in a direction to cause the by-pass valve to close and the fuel flow to the nozzle 16 and 17 to increase.

The increase in fuel flow will result in an increase in the amount of combustion taking place in the combustion chambers 14 and 15 and there will be an increase in the flow of gases through the turbine 11. With the increasing of the combustion in the chambers 14 and 15 there will be a corresponding increase in the temperature at which the gases leave the combustion chamber. If the temperature of these gases exceeds for example, 1675° F. the temperature controller 110 will be effective to cause the motor 123 to move the slider 137 to the right across the slide wire 136. The effect of this movement will be to decrease the amount of positive signal appearing upon the slider 137 and to decrease the amount of positive signal being applied to the input of the modulator and amplifier 33. It will also be noted that when the motor 34 is adjusting the by-pass valve 23 there will be a resultant movement of the slider 97 over the slide wire resistor 99 and this movement will be toward the right so that a more negative signal will appear upon the slider 97 and this will act as a rebalancing signal to attempt to eliminate the positive signal arising from the potentiometer 135.

If the engine temperature does not exceed 1675° F. the positive signal on the slider 137 will be sufficient to cause the motor 34 to drive the fuel by-pass valve to the closed position at which time the slider 97 will have moved to the extreme left hand position. When this position has been reached, the negative signal on the slider 97 will be of the same magnitude as the positive signal on the slider 137, and the modulator and amplifier will not be effective to cause further positioning of the motor 34. As soon as the temperature of the engine exceeds 1675° F. the slider 137 will begin moving toward the right and the positive signal on the slider will be decreasing so that the negative signal on the slider 97 will be predominant. The resultant negative signal on the input of the amplifier will cause the amplifier to drive the motor 34 in a direction to reduce the fuel flow. The cutting down of the fuel flow will reduce the engine temperature and the movement of the slider 97 with the movement of the motor 34 will result in a rebalancing of the system with a decrease in the amount of negative voltage appearing on the slider 97 as it is moved toward the left end terminal of the slide wire resistor 99.

The operation which has been described in connection with the acceleration of the engine from a low power position to a high power position will take place in a relatively short time. As soon as the speed of the engine shaft 13 has increased to a value at which the tachometer generator output on terminal 140 is equal in magnitude to the signal appearing upon the slider 41, the resultant signal on the grid 65 of the discharge device 66 will be zero and the discharge device will become effectively non-conducting and the relay 70 will become deenergized. As soon as the relay becomes deenergized the switch blades 72 and 73 will move out of engagement with their associated contacts 74 and 75 and the blade 73 will move into engagement with contact 76. When the blade 73 engages contact 76 the combined electrical signals from the network 31 and from the tachometer generator 56 will again be applied to the input of the modulator and amplifier 33. The network 31 and the tachometer generator 56 will remain in control of the amplifier for all gradual changes of engine speeds and the fuel flow will be controlled to maintain that speed substantially constant.

When the operator moves the power lever in a power decreasing direction the apparatus will remain in control of the network 31 and tachometer generator 56 inasmuch as the movement of the slider 41 in a minimum power direction results in a less positive voltage appearing upon the slider so that there will be, when combining the tachometer generator signal therewith, a predominantly negative voltage applied to the grid 65 of the discharge device 66. This negative voltage will maintain the current flow in the discharge device 66 below that value necessary to energize the relay 70. Thus, the relay will remain in the position in which it is shown upon the drawing with the control signal which appears upon the conductor 80 being applied to the input of the modulator and amplifier 33 to control the operation of the fuel flow control motor 34.

From the foregoing it will be seen that there have been provided a new and improved engine control apparatus which normally controls the fuel flow to the engine in accordance with engine speed and which, upon an acceleration condition existing, controls the fuel flow to the engine in accordance with engine temperature. It will also be seen that there has been provided for accomplishing this a new and improved motor control apparatus. While many modifications will be obvious to those skilled in the art, it is to be understood the scope of the invention is limited to the appended claims.

We claim as our invention:

1. Apparatus for controlling the operation of fuel flow control means for a combustion engine, comprising in combination, motor means adapted to be connected in a controlling relation to the fuel flow control means, electrical engine speed selecting means, relay means, electrical engine speed sensing means, connection means for connecting said electrical engine speed sensing means to said relay means, second connection means for connecting said electrical speed selecting means to said relay means, electrical connection means connecting said relay means in controlling relation to said motor means so that said motor means will be controlled in accordance with the signal produced by said speed indicating means and said speed selecting means, engine temperature responsive means, and third connection means for connecting said engine temperature responsive means to said relay means, said relay means controlling said connection means in a manner to provide a normal control of said motor means by said engine speed sensing means and said engine speed selecting means until said signal exceeds a predetermined value and then to transfer control of said motor means to said engine temperature responsive means.

2. Apparatus for controlling the operation of fuel flow control means for a combustion engine, comprising in combination, motor means adapted to be connected in a controlling relation to the fuel flow control means, electrical engine speed selecting means having an output signal indicative of the selected speed of the engine, electrical engine speed indicating means having an output signal indicative of the actual speed of the engine, electrical amplifying means connecting both said speed selecting means and said speed indicating means in a controlling relation to said motor means so that the operation of said motor means depends on the summation of said signals, electrical load compensation means connected to said amplifying means to cause said motor means to be operative until the indicated speed equals the selected speed, engine temperature responsive means, control signal responsive switch means, and means including said switch means when actuated disconnecting said speed selecting means, said speed indicating means and said load compensation means from said amplifying means and connecting said temperature responsive means to said amplifying means, said means including said switch means reconnecting said load compensation means as a rebalancing means on the input of said amplifying means.

3. Control apparatus for a combustion engine having fuel flow controlling means, comprising in combination, motor means arranged to be connected in a controlling relation to the fuel flow controlling means, signal producing means connected to the engine for producing an output proportional to the speed of the engine, manually adjusted signal producing means having an output signal indicative of the selected engine speed, means interconnecting both of the signal producing means in controlling relation to said motor means for controlling the fuel flow of the engine, temperature responsive means for producing a signal proportional to engine temperature, and automatic condition responsive switch means connecting said temperature responsive means in controlling relation to said motor means, said automatic condition responsive switch means comprising means responsive to a predetermined difference between the outputs of said first named signal producing means and said manually adjusted signal producing means.

4. Control apparatus for a combustion engine having fuel flow controlling means, comprising in combination, motor means arranged for connection in a controlling relation to the fuel flow controlling means, a signal producing means having an output signal proportional to the speed of the engine, manually adjusted signal producing means having an output signal proportional to the selected engine speed, means interconnecting both of said signal producing means in controlling relation to said motor means, temperature responsive means for producing a signal proportional to engine temperature, means connecting said responsive means to affect the controlling effect of said manually adjusted signal producing means when the engine temperature rises above a predetermined value to limit the operation of said motor means, and switch means responsive to a predetermined differential between the outputs of said first named signal producing means and said manually adjusted means connecting said temperature responsive means in control of said motor means.

5. Control apparatus for a combustion engine having fuel flow controlling means, comprising in combination, motor means connected in a controlling relation to the fuel flow control means, manually operated engine speed adjusting means having an output signal indicative of the selected speed, engine speed responsive means having an output signal indicative of the engine speed, means interconnecting said adjusting means and said speed responsive means in controlling relation to said motor means so that the summation of said signals provides for operation of said motor means to maintain a selected engine speed, engine temperature responsive means, switch means connected to be actuated by said adjusting means and said speed responsive means when a predetermined difference exists between the actual engine speed and the selected speed, said switch means when actuated connecting said temperature responsive means in control of said motor means and disconnecting said speed responsive means.

6. Control apparatus for a combustion engine having fuel flow controlling means, comprising in combination, engine speed control means arranged for connection in a controlling relation to the fuel flow controlling means, engine temperature responsive means, means interconnecting said speed control means and said temperature responsive means so that said temperature responsive means will limit the operation of the fuel flow controlling means, an automatic differential condition responsive switch means, a first signal producing means, and a second signal producing means, the output signals thereof transmitted to said automatic differential condition responsive switch means, said last named means affecting disconnection of said speed control means and connection of said temperature responsive means to the fuel flow controlling means upon occurrence of a differential of a predetermined magnitude between the output signals of said signal producing means.

7. Control apparatus for a combustion engine having fuel flow controlling means, comprising in combination, motor means arranged for connection in a controlling relation to the fuel flow controlling means, engine speed control means connected to control said motor means, said engine speed control means comprising a selected speed signal producing means and an actual speed signal producing means, engine temperature responsive means connected to limit the operation of said speed control means when the engine temperature exceeds a first predetermined value, and automatically operative condition responsive means having the output signals of said signal producing means transmitted thereto, said condition responsive means arranged to disconnect said speed control means and connect said temperature responsive means in control of said motor means upon the occurrence of a predetermined condition differential between the output signals of said signal producing means, said temperature responsive means controlling fuel flow to maintain engine temperature below a second predetermined value.

8. Control apparatus for a combustion engine having fuel flow controlling means, comprising in combination, motor means adapted for connection in a controlling relation to the fuel flow controlling means, engine speed control means normally connected in a controlling relation to control said motor means, means including load compensation means connected to said speed control means to maintain engine speed at a desired value, engine temperature responsive means, switch means when actuated for disconnecting said speed control means and connecting said temperature responsive means in a controlling relation to said motor means, and means including said switch means when actuated reconnecting said load compensation means as a rebalancing means when said temperature responsive means is controlling said motor means.

9. Control apparatus for a combustion engine having fuel flow controlling means, comprising in combination, motor means adapted to be connected in a controlling relation to the fuel flow controlling means, engine speed control means normally connected to control said motor means, load compensation means comprising a reactive impedance connected to said motor means, engine temperature responsive means, switch means when actuated for disconnecting said speed control means and connecting said temperature responsive means to said motor means, and means including said switch means when actuated for effectively disconnecting said reactive impedance from said motor means.

10. Control apparatus for a combustion engine having fuel flow controlling means, comprising in combination, engine speed selecting means, engine speed indicating means, motor means arranged in a controlling relation to the fuel flow controlling means, means connecting said selecting means and said indicating means in controlling relation to said motor means, engine temperature responsive means, control means responsive to the difference between selected speed and indicated speed, means including switch means and said control means connecting said temperature responsive means in control of said motor means when the indicated speed is different than the selected speed by a predetermined amount.

11. Apparatus for controlling the flow of fuel to a combustion engine having fuel flow controlling means, motor means adapted to be arranged in a controlling relation to the fuel controlling means, first electrical circuit means having an output signal adjustable by manual means, a second electrical circuit means having an output which varies with changes in engine speed, electrical signal combining means connected to said first and second circuit means for combining said output signals and connected in a controlling relation to said motor means, a third electrical circuit means having an output which varies with changes in engine temperature, and differential signal responsive switch means operable upon the occurrence of a difference in the magnitudes of the output signals of said first and second electrical circuit means to disconnect said first and second circuit means from said signal combining means and to connect said third electrical circuit means to said signal combining means for controlling said motor means.

12. Apparatus for controlling the operation of fuel flow control means for a combustion engine, comprising in combination, motor means adapted to be connected in a controlling relation to the fuel flow control means, electrical engine speed selecting means, electrical engine speed indicating means, electrical amplifying means connecting said speed selecting means and speed indicating means to reversibly control said motor means, electrical load compensation means connected to said amplifying means to maintain the indicated speed the same as the selected speed, and engine temperature responsive means connected to modify the operation of said amplifying means and thus said motor means when the engine temperature exceeds a predetermined value.

13. Control apparatus for a combustion engine having fuel flow controlling means, comprising in combination, motor means arranged for connection in a controlling relation to the fuel flow controlling means, signal producing means having an output proportional to the actual engine speed and to the rate of change of the engine speed, manually adjusted signal producing means for selecting engine speed, connection means connecting both of said signal producing means in a controlling relation to said motor means, engine temperature responsive means, and automatic condition responsive switch means connecting said temperature responsive means in a controlling relation to said motor means, said automatic condition responsive switch means comprising means responsive to a predetermined difference between the outputs of said signal producing means.

14. Control apparatus for a combustion engine having fuel flow controlling means, comprising in combination, motor means arranged for connection in a controlling relation to the fuel flow controlling means, signal producing means having an output proportional to the speed of an engine, manually adjusted signal producing means for selecting engine speed, means interconnecting both of said signal producing means and said motor means to control fuel flow, engine temperature responsive means, means connecting said responsive means to affect the controlling effect of said manually adjusted signal producing means when the engine temperature rises above a predetermined value to limit the operation of said motor means, time delay means connected to delay the effect of said responsive means, and switch means responsive to a predetermined differential between the outputs of said signal producing means connecting said temperature responsive means in control of said motor means.

15. Apparatus for controlling the operation of fuel flow control means for a combustion engine, comprising in combination, motor means adapted to be connected to the fuel flow control means, electrical engine speed selecting means, electrical engine speed indicating means, electrical amplifying means connecting both said speed indicating means and said speed selecting means to control said motor means, electrical load compensation means connected to said amplifying means, engine temperature responsive means connected to have an effect on the operation of said amplifying means when the engine temperature exceeds a first predetermined value, speed differential responsive switch means, and means including said switch means disconnecting both said speed indicating means and said speed selecting means from said amplifying means and connecting said temperature responsive means to said amplifying means, said temperature responsive means when so connected maintaining the engine temperature below a second predetermined value.

16. Motor control apparatus, comprising in combination, a controlled motor, a first control means, a second control means, load compensation means, a condition responsive switching device having a plurality of positions, and means including said switching device connecting said first control means and said load compensation means in a controlling relation to said controlled motor when said device is in a first position, said switching means connecting said second control means to said controlled motor and reconnecting said load compensation means as a rebalancing means to said controlled motor when said device is in a further position.

17. Control apparatus for a combustion engine having fuel flow controlling means, comprising in combination, engine speed selecting means, engine speed indicating means, first motor means connected in a controlling relation to the fuel flow controlling means, relay means, means including said relay means connecting said selecting means and said indicating means in controlling relation to said motor means, temperature responsive means responsive to the temperature of the engine, second motor means connected in a controlled relation to said temperature responsive means, electrical override means connected to and controlled by said second motor means, connection means connecting said override means to affect operation of said first motor means when said temperature responsive means indicates a predetermined temperature, and condition responsive switch means connecting said second motor means in control of said first motor means upon the occurrence of a predetermined condition.

References Cited in the file of this patent

UNITED STATES PATENTS

| | | |
|---|---|---|
| 1,985,981 | Edwards | Jan. 1, 1935 |
| 2,095,991 | Lysholm | Oct. 19, 1937 |
| 2,336,232 | Doran | Dec. 7, 1943 |
| 2,411,065 | Silvester | Nov. 12, 1946 |
| 2,439,750 | Nisbet et al. | Apr. 13, 1948 |
| 2,441,751 | Broggi | May 18, 1948 |
| 2,482,254 | Fairchild | Sept. 20, 1949 |
| 2,492,472 | Fortescue | Dec. 27, 1949 |
| 2,510,753 | Multhaup | June 6, 1950 |
| 2,542,499 | Fortescue | Feb. 20, 1951 |
| 2,622,393 | Edwards et al. | Dec. 23, 1952 |
| 2,632,996 | Rood | Mar. 31, 1953 |
| 2,648,194 | Jorgenson et al. | Aug. 11, 1953 |
| 2,662,372 | Offner | Dec. 15, 1953 |
| 2,697,908 | Offner | Dec. 28, 1954 |

FOREIGN PATENTS

| | | |
|---|---|---|
| 926,065 | France | Apr. 14, 1947 |